May 26, 1970  E. H. SHUFORD, JR., ET AL  3,513,568
EDUCATIONAL DEVICE

Filed Aug. 28, 1967  4 Sheets-Sheet 1

INVENTORS.
EMIR H. SHUFORD, JR.
H. EDWARD MASSENGILL, JR.
BY

ATTORNEYS

May 26, 1970  E. H. SHUFORD, JR., ET AL  3,513,568
EDUCATIONAL DEVICE

Filed Aug. 28, 1967  4 Sheets-Sheet 2

INVENTORS.
EMIR H. SHUFORD, JR.
H. EDWARD MASSENGILL, JR.
BY

*Morse, Altman & Oates*

ATTORNEYS

May 26, 1970 E. H. SHUFORD, JR., ET AL 3,513,568
EDUCATIONAL DEVICE
Filed Aug. 28, 1967 4 Sheets-Sheet 4

INVENTORS.
EMIR H. SHUFORD, JR.
H. EDWARD MASSENGILL, JR.
BY
*Morse, Altman & Oates*
ATTORNEYS United States Patent Office 3,513,568
Patented May 26, 1970

3,513,568
EDUCATIONAL DEVICE
Emir H. Shuford, Jr., 4 Lincoln Terrace, Lexington, Mass. 02173, and Herman Edward Massengill, Jr., 107 Hemlock St., Arlington, Mass. 02174
Filed Aug. 28, 1967, Ser. No. 663,635
Int. Cl. C09b 1/22
U.S. Cl. 35—8                                    8 Claims

ABSTRACT OF THE DISCLOSURE

The invention relates to an educational device for use in answering test questions. The device comprises a plurality of superimposed relatively movable plates, each plate being formed with apertures exposing portions of underlying plates. Each movable plate bears an arc, preferably color coded, representing the degree of confidence which the individual has in the correctness of his answer to a given question and a scoring function which represents the score an individual will receive if a particular answer is correct. Windows formed in the device expose a section of the scoring function and another window exposes portions of an alpha-numerical code corresponding to the graphical display of degree of confidence. Means are provided to prevent interaction between relatively movable plates.

BACKGROUND OF THE INVENTION

Field of the invention

This invention relates generally to the field of educational aids and more particularly is directed towards a novel device for use in the administration of multiple choice tests and the like whereby the individual is able to express the degree of confidence he has in his judgment in the correctness of his answer to each of several possible answers.

Description of the prior art

In a multiple choice test the individual is required to select one of two or more possible answers. For some questions the individual may be certain that a particular answer is correct but for others the student is not entirely sure that one answer is correct over one or more other possible answers. Heretofore the individual has been able to select only one of several possible answers, the selected answer carrying the same weight regardless of the student's confidence in his selected answers. Previously there has been no means by which the student could indicate and be credited for the confidence he has in a particular answer which he has selected or indicate that he has any confidence in an answer which he rejected. It is therefore an object of the present invention to provide a testing device with which the individual can make a judgment about each of several possible answers and be scored accordingly.

SUMMARY OF THE INVENTION

The invention comprises a device which, in the preferred mode, includes a plurality of superimposed and relatively movable plates. The plates are formed with arcs and graphical curves and apertures adapted to register with the curves. The movement of selected ones of the movable plates serves to expose more or less of the arc on one plate and correspondingly less or more of the arc or arcs on other plates, depending upon the degree of confidence the individual has in the particular answers. Alpha-numerical coding symbols present on the plates appear through other windows. The particular alpha-numerical symbols appear in correspondence with the exposed portion of related arcs and are employed by the individual in recording his answer.

DESCRIPTION OF THE PREFERRED EMBODIMENT

Figure 1:
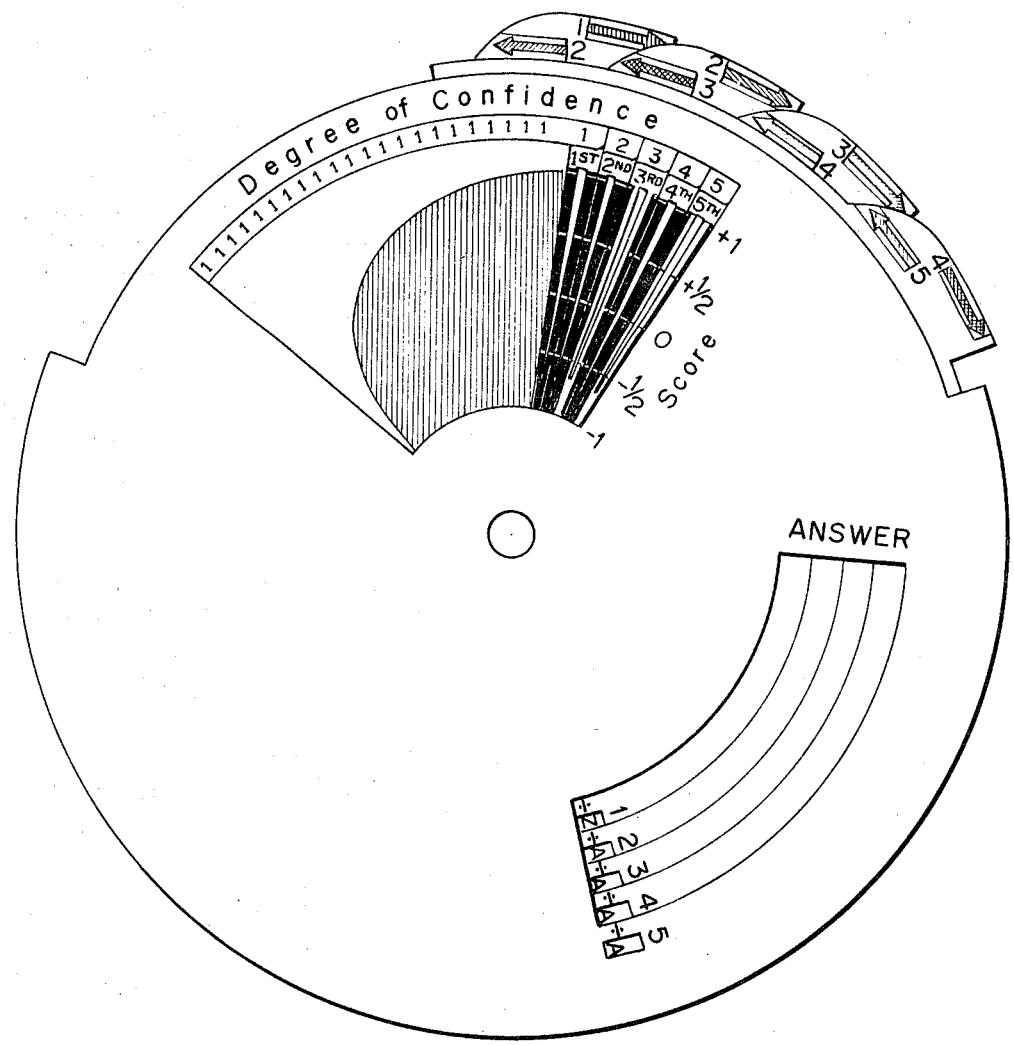
FIG. 1 is a front elevation of a scoring device made according to the invention.

By way of introduction the device illustrated and described herein is primarily intended for use by an individual in answering test questions. By using the device in conjunction with a test question an individual is able to allocate graphically the degree of confidence which he has in a set of mutually exclusive and exhaustive alternatives with this allocation yielding a code on the device which, for scoring purposes, indicates the degree of confidence that the individual has allocated to each of the various tlternatives.

A typical use of the device is in conjunction with tests in which the individual using the device is required to give his degree of confidence that each of the alternative answers to a given question is correct where one and only one is in fact correct. Typical examples of this type of test are the true or false and multiple choice questions. However, the device may also be used with short answer type questions in which the individual gives an answer and then specifies his degree of confidence that the answer supplied is correct.

Referring now to the drawings, the device in the preferred embodiment is comprised of a plurality of generally circular superimposed plates which are alternately fixed and movable. While any number of fixed movable plates may be assembled, depending upon how many alternatives are to be considered, in practice, such alternatives usually do not extend beyond five which is the capacity of the illustrated embodiment. It will be understood that the capacity may be increased or decreased by merely adding or substracting plates to the device. For every alternative there will be a fixed plate and one less movable plate.

In the illustrated embodiment plates 10, 12, 14 and 16 and 18 are fixed while plates 20, 22, 24 and 26 are movable. The plates are rotatably mounted about a pin 28 extending through the centers of the several superimposed plates.

Figure 3:
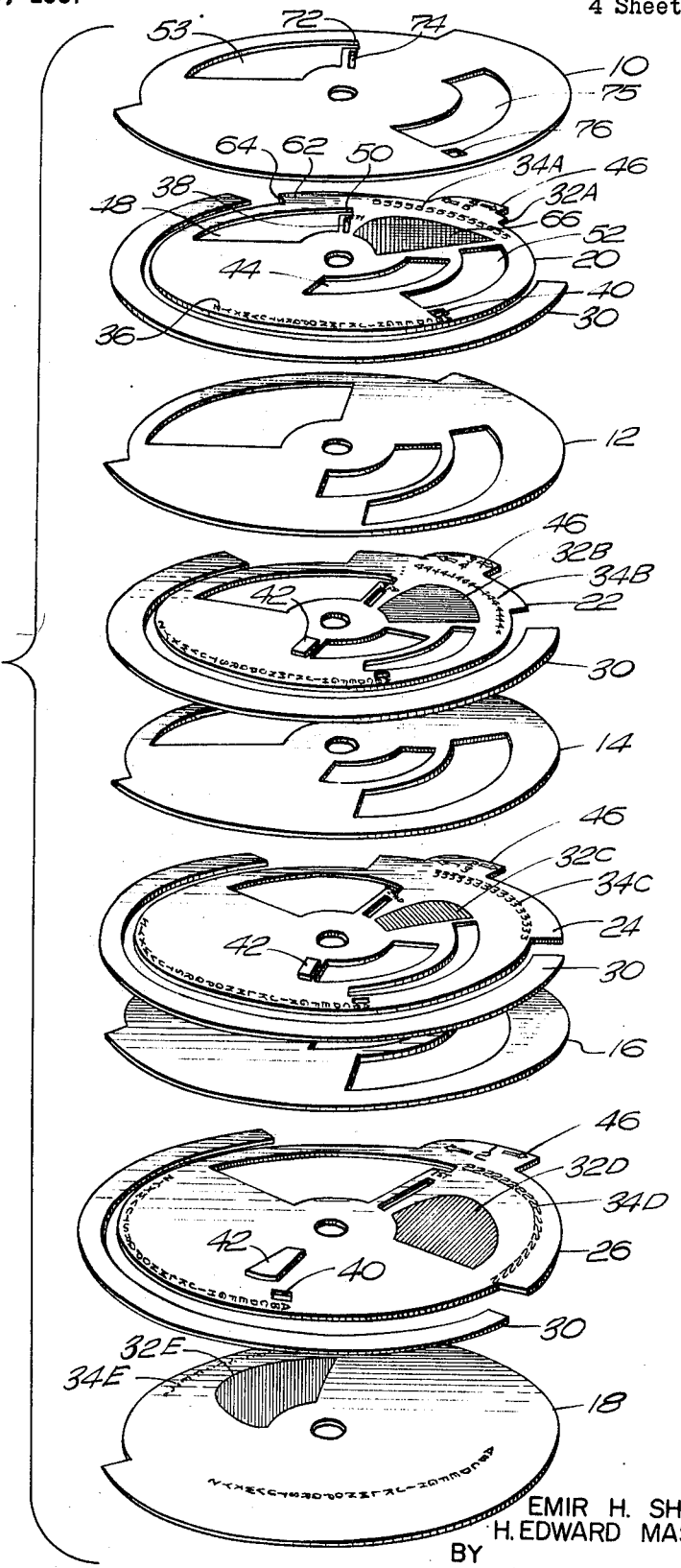
FIG. 3 is an exploded view in perspective of the device shown in FIGS. 1 and 2.

It will be seen in the exploded view of FIG. 3 that the movable plates are of somewhat smaller diameter than the fixed plates. Associated with each of the movable plates is a semicircular arc 30 which serves as a spacer between fixed plates so that when fully assembled the movable plates will have clearance between adjacent fixed plates. Each of the spacers 30 is bonded to the margins of the fixed plates when assembled.

On each movable plate and the bottom-most fixed plate there is an arc 34 A, B, C, D and E each arc being color-coded and representing degree of confidence. Each movable plate, such as the first movable plate 20, also bears scoring functions 32 A, B, C, D and E and alpha-numerical codes 36 arranged in arcs about the plate and associated with the various degrees of confidence. A slit window 38 is formed through the plate and exposes a vertical slice of the scoring curve 32 of the plate beneath it. A small second window 40 shows the coding representing the degree of confidence which has been set on the plate beneath it. A stop system is provided which prevents the movable plate above it from being moved past a certain point with respect to the plate in question. The stop system comprises bosses 42 extending through apertures 44 for interaction with adjacent movable plates. Each movable plate is also provided with a marginal tab 46 by which the movable plate is rotated clockwise or counterclockwise as desired.

A relatively large arcuate window 48 is formed through each movable plate to expose a portion of the underlying plate and into which windows portions of the underlying plates bearing the various color-coded curves and arcs may be exposed. At the upper right-hand corner of each window 48 there is formed a small window 50 which registers with the numerical arc 34 of the underlying movable plate. Another arcuate window 52 (successively smaller from plate to plate) is formed adjacent the window 40 to expose underlying alpha-numerical coding arc 36.

Each tab 46 carries the numerical symbols related to particular plates the symbols being two in number insofar as the movement of any one movable plate will increase the degree of confidence arc on one plate while decreasing the exposed portion of the arc of another plate. Thus movement of plate 20 which bears symbols 4 and 5 will either increase or decrease the exposed portion of confidence arc 34A and the scoring function 32A through a window 53 formed in the topmost plate 10 while correspondingly decreasing or increasing the color-coded arc 34B and curve 32B on the underlying movable plate 22. Plate 22 bears symbols 3 and 4 on its tab and movement of plate 22 will reflect any change in the degree of confidence between answers 3 and 4. Similarly the rear-most movable plates 24 and 26 are numbered 2 and 3 and 1 and 2 respectively on their tabs with plate 26 bearing a color-coded arc 34D and curved 32D corresponding to answer number 2 on a multiple choice question and with another color-coded arc 34E and curve 32E appearing on the back fixed plate 18 so that movement of plate 26 will increase or decrease the exposure of arcs 32D and 32E and of curves 32D and 32E on plates 26 and 18.

Each tab 46 extends radially outwards from the arcuate segment, all segments being of the same size. However, it will be noted that each tab is formed at a different angular position so that all of the tabs will be visible and one will not move in behind the other. The function of the segments is to provide stop means which cooperate with the interlock of the bosses 42 and apertures 44 in controlling the movement of the several plates. It will be understood that each end of the arcuate sector 62 indicated by reference characters 64 and 66 is adapted to butt against radial shoulders 68 and 70 formed on the fixed plates so that movement of the tabs is restricted.

Fixed plate 10 especially on FIG. 3 is formed with the window 53 and preferably is labeled "Degree of Confidence" or some such legend identifying the functional information exposed through the windows 53 and 72. Adjacent the window 53 is formed a smaller window 72 which registers with the confidence arc 34 appearing on movable plate 20. In the illustrated embodiment this confidence arc consists of a series of number 5's. Preferably this arc is color-coded to match with the color-coded curve 32A appearing on plate 20. Adjacent the window 53 is a narrow slit 74 provided with suitable graduated markings and labeled "Score." It will be understood that as the underlying plate 20 is moved clockwise or counterclockwise a slice of the color-coded curve 32A will appear through the slit 74 with the edge of the curve moving inwardly or outwardly depending upon the direction and location of the plate. The edge of the curve will serve as a coding function.

Plate 10 is also formed with another arcuate window 75 labeled "Answer" and exposing the alpha-numerical codings of underlying movable plates. Adjacent the relatively large windows 75 is a smaller window 76 labeled 5 exposing coding arc 36 of underlying plate 20.

Each fixed plate 12 generally corresponds in size and shape with the topmost plate and carries no coding or other information. Each fixed plate is formed with apertures which register with the apertures of the movable plates so as not to interfere with the data presented by the movable plates when they are moved from one position to another.

Each of the confidence arcs 34, A, B, C, D and E is of a different color, making the arcs more readily distinguishable and to make the shortening and lengthening of the arcs easier to follow. The color-coding also makes association of the arc with its score function more apparent. Each tab is provided with color-coded arrows to indicate the direction in which to move a tab in order to lengthen a certain confidence arc. The function of the confidence arcs is to graphically display complete confidence and to allow the individual to allocate this complete confidence among various alternatives. The arcs show that as confidence is given to one alternative an equal amount of confidence must be taken away from some other alternative and that the sum of the degrees of confidence for a given number of mutually exclusive and exhaustive alternatives must always be complete confidence.

The score function employed is the truncated logarithmic score function with a specified range, e.g. $-1$ to $+1$. This is one of a family of scoring functions called admissible probability measurement procedures. Any score function in this family has the property that an individual maximizes his expected score if and only if he honestly reflects his degree of confidence for each of the alternatives for which he is allocating confidence. The truncated logarithmic function is used because it is the only one of the admissible probability measurement procedure functions which depends only upon the confidence of the student in the correct answer.

The function itself is placed on the plate in relation to the confidence line so that a radius drawn through the confidence arc cuts the score function at the point which represents the score the individual will receive if he allocates that degree of confidence on this particular alternative and the alternative is correct.

The area underneath the function is filled in with the same color as the associated confidence arc. The purpose of filling the area below the function is so that it may be displayed as a linear graph. This graph is given by the score window which is part of the plate above the plate in question.

The score window for a particular alternative is contained in the plate above the plate which shows the degree of confidence and score function for the alternative in question. The score window is a window with a narrow opening which can be moved back and forth over the scoring function as the plate above the scoring function is moved to increase or decrease the score shown in the window from the score function below it. The score window of the top plate is stationary.

The window itself is marked off in the particular scale which is used for the embodiment of the unit in question.

For example, for the scale range (−1 to +1) there might be scale markings at −1, −½, 0, +½ and +1. The score window itself is number coded. It has the same number as is on the confidence arc to which it refers.

The score function to the right of any score window is completely covered and the score window is designed so that part of the score function to the left is covered. The result is that as a score window moves back and forth over a score function the window appears to fill up or decrease according to which way the movement is being made.

The height of an answer window is such that all of two or part of three code digits may be seen at once. This aids in identifying the relevant code digit. The relevant code digit is denoted by an arrow to the left of the window. This arrow points to the letter in the window which corresponds to the degree of confidence allocated to the alternative associated with that answer window. The answer window is number coded. This number which is associated with the particular alternative to which the window referred is placed above the answer window.

There is a coding on each plate which contains the confidence arc 34A, B, C, D or E representing the various degrees of confidence that can be used as answers. The degree of confidence is representative of the extent of an arc and the coding for a given alternative represents the degree of confidence visible. The coding is also arranged as an arc. The code represents the degrees of confidence between zero and complete confidence. The step size can vary according to the particular embodiment of the device. This code may also be used with machine scoring or hand scoring procedures.

Just as with the confidence arcs, the sum of the numerical equivalent of the relevant digits visible in all of the answer windows at a given time is always equal to a constant. This allows a student to be able to immediately determine if the plates for alternatives which he is not using are correctly positioned. The answer windows corresponding to each of the plates not being used should have the code for zero confidence.

In the illustrated embodiment, the 26 letters of the alphabet are employed as the answer code. The use of the 26 one digit letters give a much finer grain while requiring only one digit than would be possible if the numbers from 0 to 9 were used instead. The use of letters also serves the purpose of completely doing away with numbers in representing degree of confidence. 26 possibilities are used rather than some other number so that students would not be readily encouraged to give equally likely responses because that was the easy thing to do. The internal stopping system in the device puts a limit on the extent to which a movable plate can be moved to the left with respect to the movable plate beneath it. This means that the answer windows and the score windows are always visible and the amount of confidence visible always sums to a predetermined constant. The stopping system also makes it possible to move several plates with one tab when these plates are moved as far to the left relative to each other as possible.

The interaction of the parts of the devices is so devised that the lengths of the confidence arcs showing for any setting of the device always sum to a predetermined constant. It is also designed so that the score windows present the score as a function of the degree of confidence displayed for each alternative. This is a confidential type information in that it is score which would be received if that particular alternative were given the amount of confidence displayed and if it were the correct alternative. Thus the device displays the relation between degree of confidence and score.

It will be understood that an answer window always contains the coding which represents the associated degree of confidence displayed on the device.

The device is designed to display information graphically rather than numerically. The individual sees the degree of confidence as the extent of an arc and score as the extent of a vertical line.

If an individual is using the device to allocate his confidence in a situation in which the scoring system is not relevant, he simply makes the allocation by adjusting the length of the confidence arcs and obtains his result from the answer section. He can translate the answer code into a degree of confidence by consulting a conversion table.

If an individual is concerned both with confidence and score, he may proceed in various ways. He may begin by allocating his confidence. This will determine the conditional scores and answer pattern. Or he may set the desired conditional score which will determine a particular confidence allocation and a given answer pattern. For the first case, if he is not satisfied with the resulting conditional scores, he may want to alter his degree of confidence setting while in the second case if he is not satisfied with the resulting confidence pattern he may want to alter his conditional scores. A combination of these two procedures may be also employed.

Once the individual is satisfied with the setting in terms of confidence or score, he can then obtain his answer pattern. For example, he might copy it onto an answer card or sheet which can be machine scored or onto an answer sheet which may be hand scored.

The device may be used in conjunction with direct recording systems in which the individual pushes a button or otherwise indicates that he is satisfied with his response. This could initiate an electro-mechanical sensing of the relevant settings. Measurements may be in analog or digital form. Such an arrangement would eliminate the necessity for the individual copying his coded answer and would give nearly instantaneous input for automatic processing and feed-back to the individual.

Figure 2:
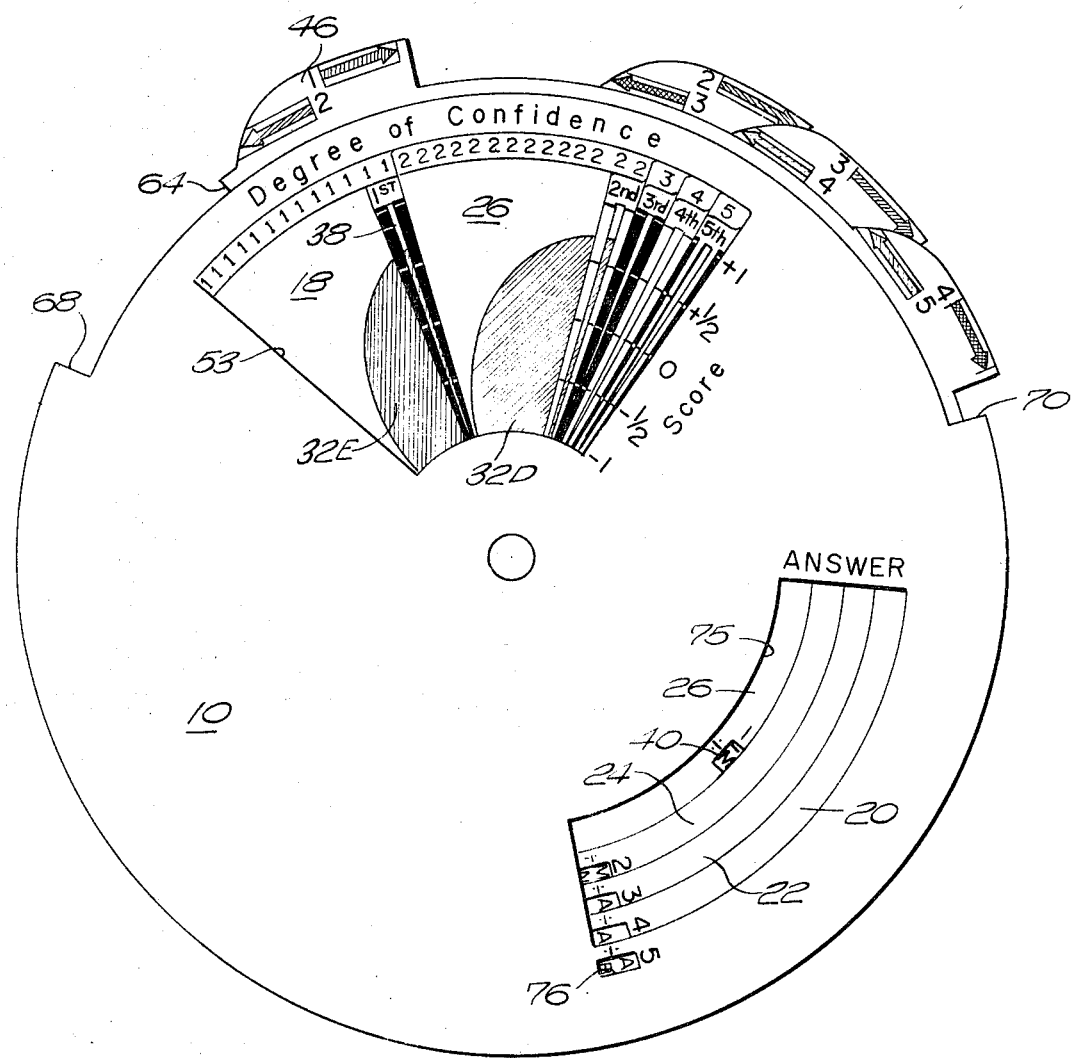
FIG. 2 is a view similar to FIG. 1 but showing the device at a different setting.

In using the device in answering multiple choice questions, the individual first determines how many possible answers there are to a given question. If only two answers are possible, such as in a true or false type situation, or a multiple choice with only two answers, plates 20, 22 and 24 are moved clockwise to their maximum positions so that no part of their associated confidence curves are visible. If there are three answers to the question then only the first two plates, namely 20 and 22, are moved to the right. If four answers only the uppermost plate is in its maximum right-hand position. Once this has been done the individual is ready to adjust the other plates so that the line on each confidence curve represents the degree of certainty that an individual has that the answer associated with that curve is the correct answer. Once the individual is satisfied with the settings he looks at the answer windows and writes down the letter in each window associated with each possible answer. For example, if the question involved is a true or false type question and the individual is completely confident that the first answer (true) is the correct answer, all of the tabs will be moved clockwise as far as possible and the device will be as it appears in FIG. 1 with confidence arc 34E for the first answer being fully exposed and the scoring function in the first slit window completely filling the window. The answer that appears in the first answer window will be Z, insofar as only the first two answer windows are employed. Z represents maximum confidence while A represents minimum confidence. If the individual is not sure which answer is correct as between the first and second given answers he would set the device as in FIG. 2 with approximately 50% of each confidence arc exposed. It will be noted that the scoring function in each of the first and second windows is approximately the same and that the answer for this situation will be MN or NM indicating an even degree of confidence in either answer.

It will be understood that an individual's score in a particular test question depends on how much confidence he has in the correct answer for that question. The more confidence he has in the correct answer, the higher his score will be. The confidence in the correct answer can range from zero confidence, in other words no confidence, to complete confidence. The letter A represents zero confidence and the letter Z represents complete confidence. The higher the individual's confidence in an answer the closer the letter representing that degree of confidence will be to Z.

Figure 4:
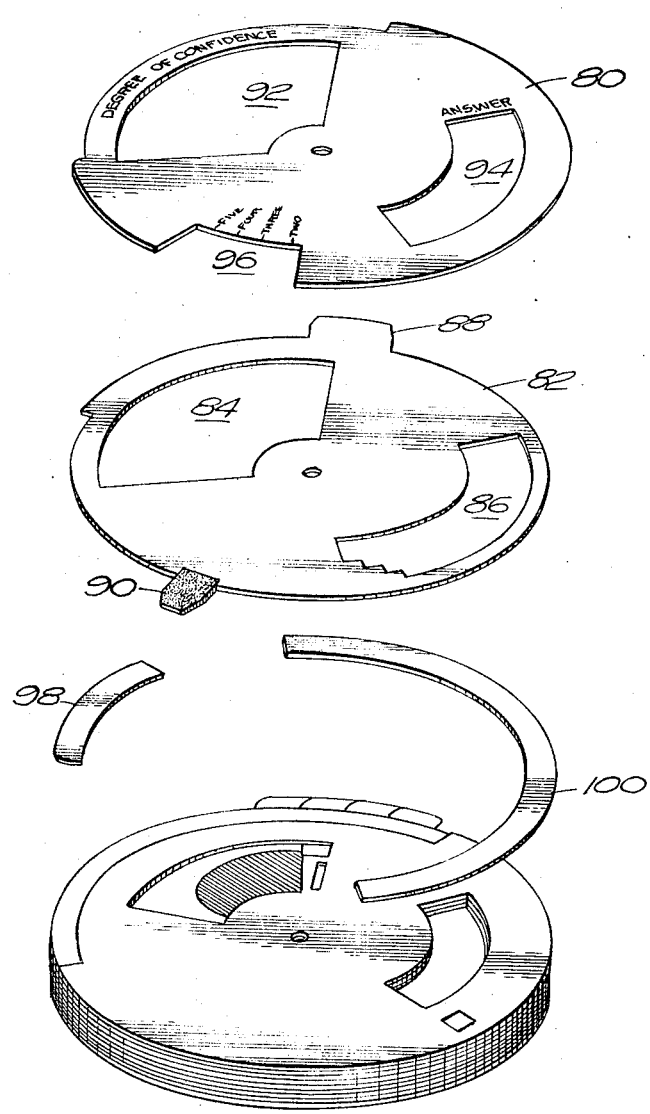
FIG. 4 is an exploded view in perspective of a modification of the invention.

Referring now more particularly to FIG. 4 there is illustrated a modification of the invention and in this embodiment two additional plates 80 and 82 are provided with plate 80 being relatively fixed and the plate 82 being relatively movable. The function of the two plates is to black out the unneeded score windows, response windows and tabs when the device is being used with questions containing less than the maximum number of answers which the device is capable of handling. For example, the illustrated embodiment of FIG. 1 can be used for questions containing from two to five possible answers. Thus when the device is being used with questions having less than five possible answers, some of the score windows, response windows and tabs will not be used. With the addition of plates 80 and 82 in the modification it is possible to adapt the device so that only the relevant degrees of confidence areas, score functions, score windows and response windows are visible for the particular question. With the modified device, the user first examines the test question to see how many possible answers are allowed and then sets the device for that number of answers.

The movable plate 82 is positioned above the top plate 10 which contains the top score window and response window. The plate 82 contains two large windows, 84 and 86, and two tabs, 88 and 90. Window 84 is designed so as to allow only the relevant confidence arcs and score windows to appear while window 86 allows only the relevant response windows to appear. The tab 88 is used as a cover tab and allows only the relevant tabs 46 to appear. The tab 90 is the "number of answers" tab and is used to alter the position of the movable plate 82 to agree with the number of answers for the questions at hand. The tab 90 is located on the lower left-hand side of the movable plate 82 so it will effectively separate the function of setting the device for the number of answers from that of allocating degree of confidence for that number of answers.

The fixed plate 80 is formed with three windows 92, 94 and 96 and is mounted above the movable plate 82. Window 92 makes visible the confidence arc, the scoring functions and score windows corresponding to the setting of the number of answers tab 90. Window 94 makes visible the relevant response windows and window 96 in the lower left portion of the plate exposes the number of answers 90. This plate also contains lettering denoting the degree of confidence area, the response area and the "number of answers" settings.

The fixed plate 80 is attached to the plate 10 with the top score window and response window by means of two arcuate spacers 98 and 100 which are in the same plane as the movable plate 82. Spacer 98 runs from the left corner of the device down to the left extent of the window exposing the "number of answers" tab 90 and spacer 100 runs from the right extent of this window to the right corner of the device.

Having thus described the invention, what we claim and desire to obtain by Letters Patent of the United States is:

1. A device for indicating confidence in the correctness of one or more alternative answers to a given question, comprising:
   (a) a plurality of superimposed and relatively movable members,
   (b) said members having a graphical curve representing score, an arc representing confidence and alphanumerical codes providing coded answer data on the faces thereof,
   (c) said members being formed with first openings therethrough whereby curves and arcs on underlying members may be selectively exposed by movement of said members,
   (d) said members being also formed with second openings therethrough in register with portions of said codes whereby coding data corresponding to the amount of said arcs visible through said first openings will be visible through said second openings,
   (e) said members being further formed with third openings therethrough each in the form of a slit for exposing a linear segment of the curve on an underlying member, the extent of said segment representing scoring data and corresponding to the exposure of said curve through said first opening,
   (f) the coded answer data presented by an overlying member being specified by an adjacent underlying member.

2. A device according to claim 1 wherein said members are in the form of planar substantially circular and relatively rotatable plates.

3. A device according to claim 1 including a fixed member mounted between each of said movable members and formed with openings therethrough in register with said first, second and third openings in said movable members.

4. A device according to claim 1 including interlock means between said movable members to permit limited relative movement between said members.

5. A device according to claim 1 including marginal tabs on said members, said arc and said curves and said tabs being color coded.

6. A device according to claim 5 including a movable masking member superimposed over said plurality of members, said masking member being formed with openings and a tab generally registering with the openings and tabs of said plurality of members, selective movement of said masking member being adapted to mask over selective and related portions of said openings and said tabs of said plurality of members.

7. A device for indicating confidence in the correctness of one or more alternative answers to a given question, comprising
   (a) a plurality of superimposed and relatively movable members,
   (b) at least some of said members having a graphical curve representing score and an arc representing confidence on the faces thereof,
   (c) at least some of said members being formed with openings therethrough whereby one or more curves or arcs on underlying members may be selectively exposed by movement of said members,
   (d) at least some of said members being also formed with a slit adjacent said openings for exposing a linear segment of the curve on an underlying member, the extent of said segment representing scoring data and corresponding to the exposure of said curve through said opening, said scoring data presented by an overlying member being specified by an adjacent underlying member, and
   (e) means responsive to the relative position of said members for providing answer data.

8. A device for indicating confidence in the correctness of one or more alternative answers to a given question comprising:
   (a) a relatively fixed base having a graphical curve representing score and an alpha-numerical code providing coded answer data on the face thereof;
   (b) at least two superimposed and relatively movable members, each member formed with at least one opening;
   (c) each of said members having a graphical curve reperesnting score and an alpha-numerical code providing coded data on the face thereof;

(d) the coded answer data presented by an overlying member being specified by an adjacent underlying member.

References Cited

UNITED STATES PATENTS

| | | |
|---|---|---|
| 1,966,971 | 7/1934 | Rochlus. |
| 2,007,055 | 7/1935 | Knust _____ 35—74 XR |
| 2,385,732 | 9/1945 | Redding _____ 35—7 X |
| 2,856,888 | 10/1958 | Stunk _____ 35—74 XR |
| 3,281,072 | 10/1966 | Dawson. |
| 3,365,818 | 1/1968 | Greiner _____ 35—7 X |
| 3,419,973 | 1/1969 | Manotas et al. ____ 35—74 XR |

EUGENE R. CAPOZIO, Primary Examiner

W. H. GRIEB, Assistant Examiner

U.S. Cl. X.R.

35—74